United States Patent
Spering (10) Patent No.: US 9,255,806 B2
(45) Date of Patent: Feb. 9, 2016

(54) METHOD FOR VISUALIZING A POSITION OF A VEHICLE NAVIGATING A PIPE

(71) Applicant: Axel Spering, Aachen (DE)

(72) Inventor: Axel Spering, Aachen (DE)

(73) Assignee: Spering Micro-Systems, Aachen (DE)

( * ) Notice: Subject to any disclaimer, the term of this patent is extended or adjusted under 35 U.S.C. 154(b) by 154 days.

(21) Appl. No.: 13/887,313

(22) Filed: May 4, 2013

(65) Prior Publication Data

US 2014/0142844 A1    May 22, 2014

(30) Foreign Application Priority Data

May 4, 2012 (DE) .......................... 10 2012 207 415

(51) Int. Cl.
*G01C 21/32* (2006.01)
*F16L 55/48* (2006.01)
*F16L 55/26* (2006.01)
*G01C 7/06* (2006.01)

(52) U.S. Cl.
CPC ............... *G01C 21/32* (2013.01); *F16L 55/265* (2013.01); *F16L 55/48* (2013.01); *G01C 7/06* (2013.01)

(58) Field of Classification Search
CPC .......... G09G 2360/00; G09G 2360/10; G09G 2360/12
USPC ........ 701/454, 457, 459, 432, 28; 901/44, 41, 901/1; 83/178; 104/138.2; 700/245, 900; 116/35 R, 36; 348/82, 84, 85, 94, 95, 348/113, 114, 118, 119, 135, 142, 148
See application file for complete search history.

(56) References Cited

U.S. PATENT DOCUMENTS

| | | | | |
|---|---|---|---|---|
| 3,362,658 A * | 1/1968 | Ito | .............................. | F41G 7/36 244/3.2 |
| 5,392,715 A * | 2/1995 | Pelrine | ..................... | F16L 55/28 104/138.2 |
| 5,736,821 A * | 4/1998 | Suyama | ................... | F16L 55/26 318/16 |
| 6,108,597 A * | 8/2000 | Kirchner | .................... | E03F 7/12 180/167 |
| 6,175,380 B1 * | 1/2001 | Van Den Bosch | .. | E21B 47/0002 348/125 |
| 8,082,064 B2 * | 12/2011 | Kay | ........................ | B25J 9/1697 250/208.1 |
| 2002/0113869 A1 * | 8/2002 | Kirkwood | ................. | F17D 3/01 348/84 |
| 2002/0113870 A1 * | 8/2002 | Mueckl | .................... | F16L 55/26 348/84 |
| 2004/0020270 A1 * | 2/2004 | Kuikka | ................. | B08B 9/0433 73/49.5 |
| 2005/0115337 A1 * | 6/2005 | Tarumi | .................... | F16L 55/28 73/865.8 |

(Continued)

FOREIGN PATENT DOCUMENTS

DE    102010044465 A1    3/2012
WO    WO2012031731 A1    3/2012

OTHER PUBLICATIONS

Lawson et al., Augmented reality for underground pipe inspection and maintenance, Nov. 1998, SPIE.*

(Continued)

*Primary Examiner* — Thomas G Black
*Assistant Examiner* — Sara Lewandroski
(74) *Attorney, Agent, or Firm* — Von Rohrscheidt Patents (57) ABSTRACT

A method for visualizing a position of a vehicle configured for navigating a pipe within the pipe on a display device wherein the visualization on the display device is at least partially performed based on a virtual representation and the pipe is graphically represented at least in sections and preferably in a form of lines defining its enveloping surfaces on the display device, wherein the vehicle and preferably its movement is also represented on the display device thus within the pipe.

19 Claims, 5 Drawing Sheets

(56) References Cited

U.S. PATENT DOCUMENTS

| | | | | |
|---|---|---|---|---|
| 2005/0151841 A1* | 7/2005 | Nelson | ............... | G01N 21/954 348/82 |
| 2006/0074525 A1* | 4/2006 | Close | ................ | B25J 9/1617 700/245 |
| 2006/0290779 A1* | 12/2006 | Reverte | ............... | E03F 7/10 348/84 |
| 2011/0272144 A1* | 11/2011 | Belcher | ............... | E21B 47/00 166/250.01 |
| 2012/0069172 A1* | 3/2012 | Hudritsch | ........... | G01N 21/954 348/84 |
| 2012/0257042 A1* | 10/2012 | McKaigue | ........... | G01N 21/954 348/84 |
| 2013/0265409 A1* | 10/2013 | Tjhang | ............... | H04N 5/23229 348/82 |

OTHER PUBLICATIONS

Campos et al., Differential Kinematics of Serial Manipulators Using Virtual Chains, 2005, ABCM.*

Ryew et al., Inpipe Inspection Robot System with Active Steering Mechanism, 2000, IEEE.*

* cited by examiner

METHOD FOR VISUALIZING A POSITION OF A VEHICLE NAVIGATING A PIPE

RELATED APPLICATIONS

This application claims priority from German patent application DE 10 2012 207 415.5, filed on May 4, 2012, which is incorporated in its entirety by this reference.

FIELD OF THE INVENTION

The invention relates to a method for visualizing a position of a vehicle navigating a pipe on a display device.

BACKGROUND OF THE INVENTION

When work is done in a closed pipe, robots are typically being used which are configured to inspect the pipe and also perform work on the pipe. In particular for doing work on the pipe, robots of this type which are typically configured as vehicles include at least one tool.

A special operating area for vehicles of this type is repairing damaged pipes which are damaged in particular through leaks in a wall of the pipe. In order to repair damages of this type, a so-called liner is inserted into the respective pipe. The liner is a hose shaped elongated structure which is applied from an inside of the pipe circumferentially to an inner wall of the pipe and which forms a new pipe wall which covers and seals the damaged locations. A liner of this type, however, in addition to covering undesirable damages, also covers areas which have been kept open intentionally. These are in particular inlets of other pipes which should certainly be kept open after a repair.

The vehicle or robot recited of the general type supra is used to process those openings in the pipe wall which have been closed by the liner unintentionally, wherein for example the recited tool is used. Through this tool, the wall formed by the liner can be locally milled open or bored open in order to relieve the desired opening in the original pipe wall again. In practical applications, there are in particular two problems.

On the one hand side, after inserting the liner, positions of the inlets which were previously easily identifiable for example by a camera are not optically detectable anymore. In order to still move the vehicle to the correct locations along the pipe after inserting the liner and in order to mill the liner open at the correct locations through the tool, a map is typically produced by running the vehicle through the pipe according to the known technique, wherein the map subsequently facilitates correctly positioning the vehicle and the tool.

This method has problems in that it is prone to many errors, which makes it very likely that the pipe or the liner is processed in a faulty manner. Thus, it occurs frequently that some of these inlets are omitted when inlets that are closed by the liner are being milled open, drilling is performed at the wrong locations, inlets cannot be found anymore, and similar. In particular, known devices that are available to operators are typically insufficient to provide low error proneness.

On the other hand side, dust and contaminants are generated while processing the inserted liner with the tool of the robot. Devices for providing orientation within the pipe which are based on transmitting images of a camera or similar are thus typically unusable for the operator since the contamination typically blocks a clear view of the respectively processed location. Accordingly, the operator does not have any detailed information regarding the orientation of the tool, work progress and similar, during the processing. Instead, the operator has to perform the processing in steps, this means interrupted over and over again and wait until the dust created during processing has settled and a clear view of the pipe wall is reestablished. The required time is very detrimental, because relieving the inlet is particularly time critical. The inlets must not be locked too long, since otherwise water flowing for example from a connected dwelling backs up in the branch pipe and can cause damages. Furthermore, the processing time for the finished liner should be kept as short as possible for cost reasons.

For example, DE 10 2010 044 465 A1 illustrates a vehicle which is configured with sensors. These sensors capture data, among other things regarding a position of the tool of the vehicle and forward the data to a processing unit which is in turn connected with a display unit. On this display unit, for example, the inclination of the robot, with respect to its longitudinal axis and transversal axis, is illustrated. Information of this type can be very useful during processing; however, it is not suited to solve the problems recited supra.

BRIEF SUMMARY OF THE INVENTION

Thus it is an object of the invention to provide a method that is suitable to provide a respective operator with detailed information regarding the processing status and the position and the orientation of the vehicle within the pipe without requiring a live camera feed from the pipe.

The object is achieved according to the invention through a method for visualizing a position of a vehicle in a pipe on a display device wherein the vehicle is configured for navigating the pipe, wherein the visualization on the display device is at least partially performed with at least one virtual representation and the pipe is graphically represented at least in sections and preferably by lines defining its enveloping surfaces on the display device, and the vehicle and preferably its movement is also represented on the display device and thus within the pipe. Since the representation on the display device is at least partially virtual, the representation is independent from real contaminations or other obstacles in the pipe.

A "virtual representation" according to the present application is any form of representation on the display device, which is not derived from a real image captured real time, for example by a camera module. This includes in particular artificially generated graphics which include, for example, a schematic representation of the vehicle or the pipe itself. However, it is also conceivable that a representation of the vehicle on the display device is formed by a real image of the vehicle which has been captured at an earlier point in time. Since a representation of this type, however, does not describe the respective current image of the vehicle, this is also a virtual representation according to the instant application. Accordingly, the fact that the vehicle itself is represented on the display device already implies that a virtual representation is used. The reason is that real live images within the pipe are typically captured by a camera module which is mounted at the vehicle. A camera module of this type, however, is generally not configured and intended to capture the vehicle itself and simultaneously also the pipe since it cannot be simultaneously oriented towards the vehicle and also towards the pipe.

A pipe according to the instant application is an individual pipe or a pipe section, or a grid of pipes that is made from a plurality of individual pipes. Branches, inlets and similar are also pipes according to the instant application.

A display device is any device for displaying virtual graphics and displaying real captured images. These are in particular LCD and LED screens which are commercially available off the shelf. Alternatively also cathode ray tubes, projectors and similar can be used.

The method according to the invention enables the vehicle operator to view and check the position of the vehicle in a virtual manner on the display device any time. Advantageously, even the movement of the vehicle is indicated to the operator so that an at least partially virtual live image of the interior of the pipe is generated. This has the advantage that the vehicle operator always gets an impression of the position and work progress during the processing, wherein impairments that are generated by the processing process itself, for example contaminations, do not have any influence at all.

Furthermore, the typically schematic representation which only depicts essential portions of the pipe, for example using the described line structure, enables the operator to monitor current work process in a much simpler manner than previously provided. This applies, in particular, with respect to processed and non-processed sections of the pipe and/or positions in the pipe.

In an advantageous embodiment of the method according to the invention, data with respect to the position and the movement of the vehicle shall be determined by recording position changes of the vehicle from a start position of the vehicle which is known in the representation of the pipe. When data of the pipe is used, advantageously because the pipe is already captured in the form of digital data and this data can be used or when a navigation of the pipe has been performed before processing during which navigation respective data has been collected, a current position of the vehicle can be computed continuously through the position and movement data of the vehicle starting from the start position. This way, the representation according to the invention is reliable so that the vehicle operator can reliably control the vehicle based only on the visualization represented on the display device.

A real image from the interior of the pipe thus becomes more and more redundant.

During a preceding navigation of the pipe, it is particularly advantageous when data regarding the extension of the pipe is generated during the navigation, in particular also data regarding the position and the geometry of branches and/or inlets of other pipes into the pipe are captured, wherein data capture is preferably performed through a camera arranged at the vehicle. This way, an image of the entirety of the respective pipe or pipe grid is generated based on which the vehicle can be subsequently controlled starting from a starting position, wherein the control can be solely performed based on the virtually displayed pipe.

In order to indicate work progress to the operator, it is particularly helpful to graphically emphasize the branches and/or inlets on the display device, in particular to represent them in color. The color display virtually eliminates the accidental omission of particular inlets during subsequent processing which occur over and over again with the known techniques. Besides the color representation, overlaying warning indications, and similar is equally conceivable as soon as processing an inlet was accidentally omitted. The risk of complex and expensive rework is thus reduced substantially to zero.

For representing the pipe on the display device, using grid lines is particularly advantageous. This representation only provides details which are necessary for the operator of the vehicle for control purposes, while superfluous information is omitted. Thus, the grid lines are particularly well suited to illustrate the walls of the pipe and inlets opening into the pipe.

For a higher degree of realness, it is however also conceivable to photographically represent the pipe on the display device, or to include real captured images into the otherwise virtual representation. This can convey a better impression of the actual conditions in the pipe and can thus facilitate and/or accelerate the processing. Choosing the suitable representation depends on the respective processing situation.

The method is furthermore particularly advantageous when the vehicle includes at least one tool for processing in particular the pipe, in particular a milling and/or boring tool and a camera in particular for monitoring the processing performed with the tool. In particular for a vehicle which is configured with a tool of this type, the suggested visualization is particularly suitable since, as described supra, in particular when using a tool of this type, visibility within the pipe can be significantly impaired but controlling the vehicle based on the visualization is completely unimpaired. The camera, which eventually can convey an impression of the real conditions in the pipe, is particularly helpful with respect to an optical control of the processing result.

A representation of the vehicle is particularly advantageous in which the vehicle on the display device includes a body provided with wheels or tracks and at least one arm that is internally movably connected at which the tool and/or the camera is preferably arranged. Providing these details in the representation on the display device facilitates correct operations for the operator since the operator receives a three dimensional impression of the position of the tool and of the vehicle. Controlling the position and the orientation of the vehicle and the tool is much easier this way.

A method is particularly advantageous in which the representation of the pipe on the display device is three dimensional. A three dimensional representation is particular suitable to obtain a realistic impression of the conditions in the pipe. In particular, the correct orientation and positioning of the vehicle using a three dimensional representation is preferable.

For better optical differentiation, furthermore a representation is particularly advantageous in which the vehicle and the pipe are represented in different colors on the display device.

Furthermore, a color differentiation of sections of the pipe which have already been processed by the vehicle with respect to sections of the pipe which have not yet been processed is advantageous. This facilitates a continuous optical control of the work process.

For correctly representing the orientation of the vehicle and/or its tool and/or its arm, a method is particularly advantageous in which the vehicle is detected with respect to its position and/or orientation by at least one position sensor and/or angle sensor arranged at the vehicle. A detection of this type eventually facilitates a control of the vehicle and its periphery solely based on the visualization according to the invention.

Thus a representation of this type can be particularly advantageous in which the visualization on the display device is performed in plural portions, preferably in two portions, wherein further preferably, a first portion of the visualization includes the position of the vehicle within the pipe, and the second portion of the visualization includes a detailed representation of the vehicle and/or of a tool of the vehicle. This form of representation facilitates detailed viewing of the vehicle while simultaneously capturing an overview of the pipe to be navigated or processed.

For representing the pipe, the option of representing the lines of the pipe which form the enveloping surface has been proposed supra. In a representation in which the enveloping surfaces of the pipe are completely filled, thus are represented as surfaces, it can be particularly advantageous when the pipe is represented transparent or partially transparent or partially open on the display device at least at locations of the pipe where the vehicle is positioned. This way, the vehicle is continuously visible within the pipe and visible to the operator.

Alternatively, a minimized representation is conceivable on the display device. This provides that the pipe and preferably an orientation of the vehicle within the pipe are only represented by body axes. Body axes in this context are axes which define a respective body with respect to its position. Axes of this type are in particular a longitudinal-, vertical- and transversal-axis. Body axes of this type are advantageously provided for the relevant representation elements. Thus it can be for example advantageous to illustrate a longitudinal axis of the pipe like the three position axes of the vehicle and of the tool. Furthermore, a visualization of the longitudinal axis of all inlets is advantageous, wherein interfaces between inlets and the respective main pipe section are also emphasized through axis intersections. Eventually, a highly schematic and simplified representation provides all relevant information which is required by the operator for performing for example a pipe repair.

BRIEF DESCRIPTION OF THE DRAWINGS

The invention is subsequently described in more detail based on embodiments with reference to drawing figures, wherein.

DETAILED DESCRIPTION OF THE INVENTION

Figure 1:
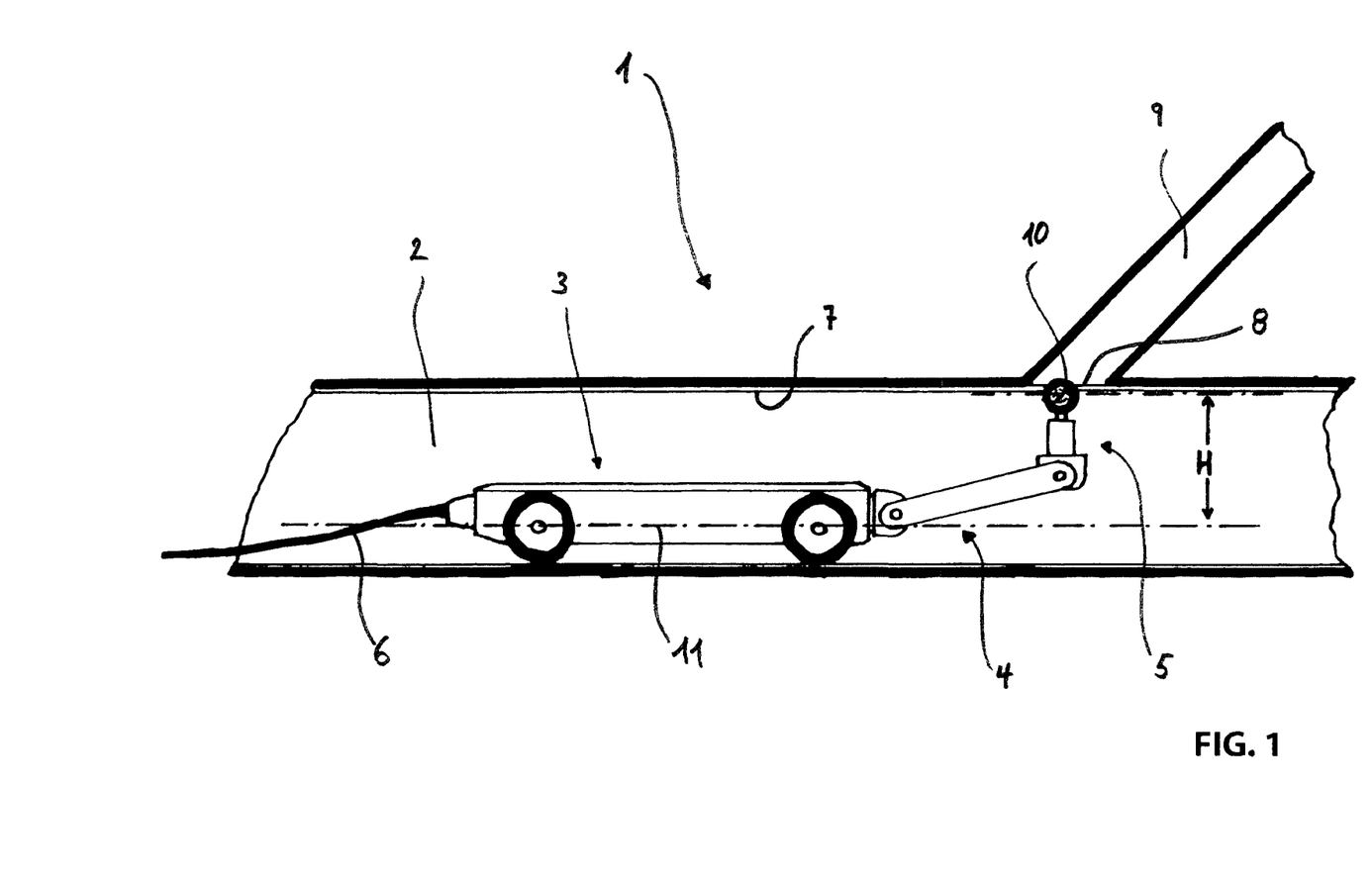
FIG. 1 illustrates a two dimensional visualization of a position of a vehicle within a pipe.

A first embodiment which is illustrated in FIG. 1 illustrates a first visualization 1 according to the invention, which is configured as a two dimensional visualization. The visualization illustrates a sectional view along a longitudinal axis of a pipe 2, wherein a vehicle 3 is positioned within the pipe 2. The vehicle 3 includes an arm 4 at a forward end and a tool 5 attached at the arm. The vehicle 3 is provided with a connecting cable 6 at a rear end, wherein data recorded at the vehicle 3 is transferrable from the vehicle 3 to a data processing unit that is not illustrated. Furthermore, a distance of the vehicle 3 that is measured from a start point of the pipe 2 can be determined through the connecting cable 6.

The visualization 1 illustrated in FIG. 1 would typically be provided in combination with at least one other two dimensional representation which enables an operator of the vehicle 3 to precisely determine a position of the vehicle 3 within the pipe 2. The illustrated visualization 1 is particularly suited to illustrate an engagement of the tool 5 with a wall of a liner 7, wherein the liner 7 covers an opening 8 of the inlet 9 in the illustrated embodiment. This inlet 9 shall be relieved through the tool 5. The visualization 1 enables the tool operator to determine that a height H of a tool head 10 of the tool 5 is over a longitudinal axis 11 of the vehicle is selected so that the wall of the liner 7 is impacted. The machine operator is thus enabled to monitor the position of the vehicle 3 live even when a direct view for example through a camera is very restricted due to the processing within the pipe 2.

Figure 2:
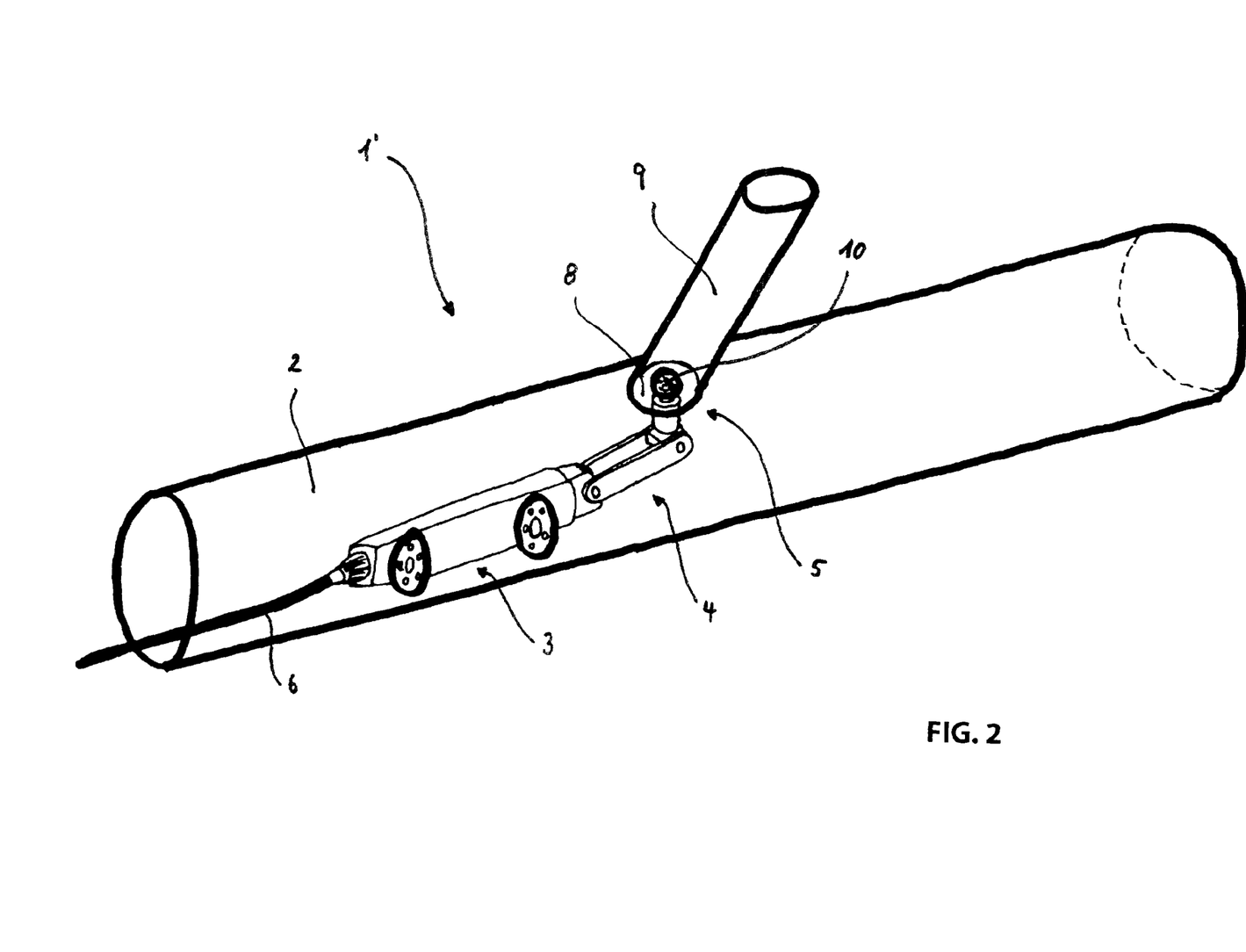
FIG. 2 illustrates a three dimensional visualization of a position of a vehicle within a pipe.

In another embodiment which is illustrated in FIG. 2, a three dimensional visualization 1' of the position of the vehicle 3 in the pipe 2 that is already illustrated in FIG. 1 is represented. From this visualization 1', in particular a three dimensional position of the inlet 9 on a wall of the pipe 2 is evident in comparison to the visualization 1. A combination of the visualizations 1 and 1' is easily feasible in order to facilitate different perspectives of the vehicle 3 and its tool 5 for the machine operator. Thus, the described height H is less visible from the visualization 1' according to FIG. 2 in comparison with the visualization 1 according to FIG. 1, whereas the position of the inlet 9 at the wall of the pipe 2 is not evident from the visualization 1. The wall of the pipe 2 in the visualization 1' is at least configured transparent in the portion of the vehicle 3, so that the vehicle 3 is detectable on a display device through the wall of the pipe 2.

The visualizations 1 and 1' respectively only illustrate details of the pipe 2. In an implementation of the method according to the invention, it is feasible that illustrations as depicted in FIGS. 1 and 2 only illustrate a blown up detail and for example through a zoom function which can be implemented in software, additional portions of the pipe 2 and optionally additional inlets can be illustrated in the visualization 1, 1'.

Figure 3:
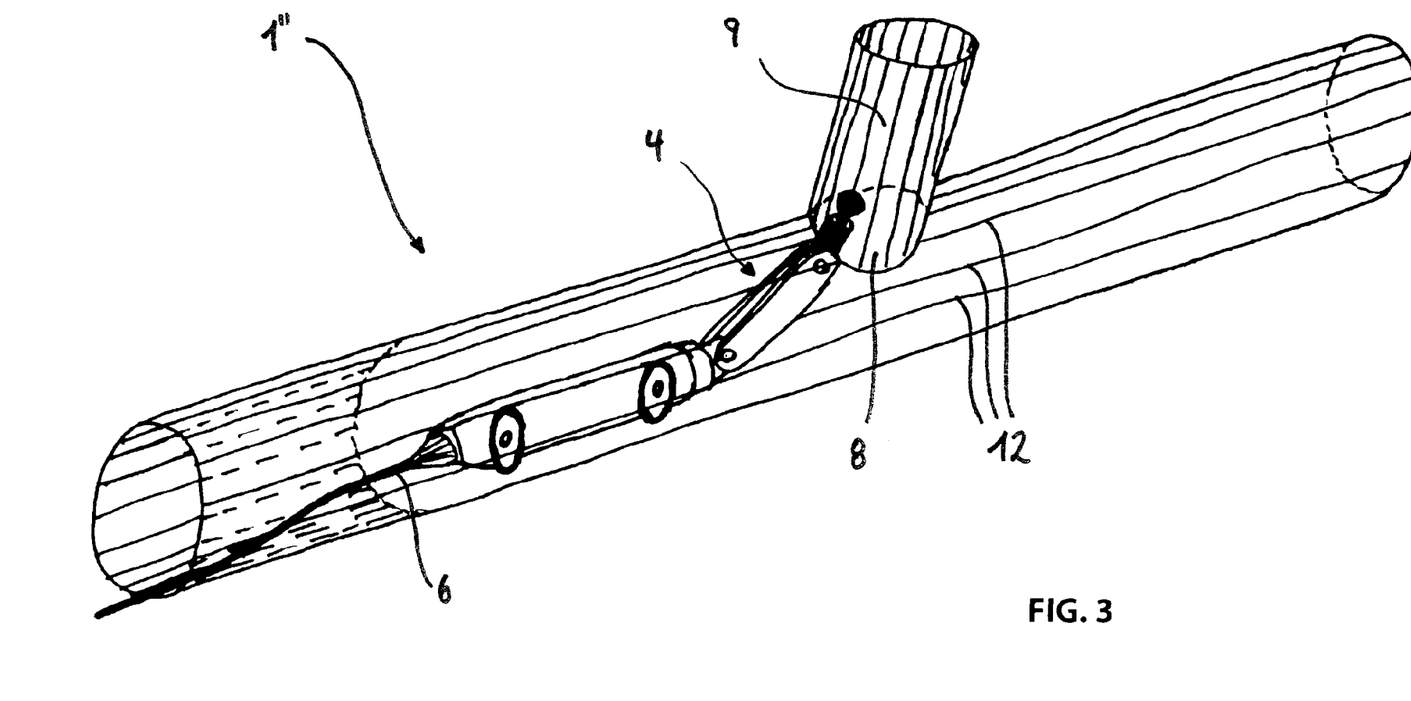
FIG. 3 illustrates another three dimensional visualization of a position of a vehicle within a pipe, wherein the pipe is represented by lines defining its enveloping surfaces.

FIG. 3 illustrates another three dimensional visualization 1' of the pipe 2, wherein the pipe 2 is illustrated in this embodiment through the lines 12 defining its enveloping surface. Instead of a full surface representation of the enveloping surface, this means of the wall of the pipe 2, the pipe 2 is only visualized through the lines 12 according to the embodiment of FIG. 3. This facilitates the representation of the pipe 2 on a display device. In particular, a required computation effort can be reduced for visualization purposes.

Figure 4:
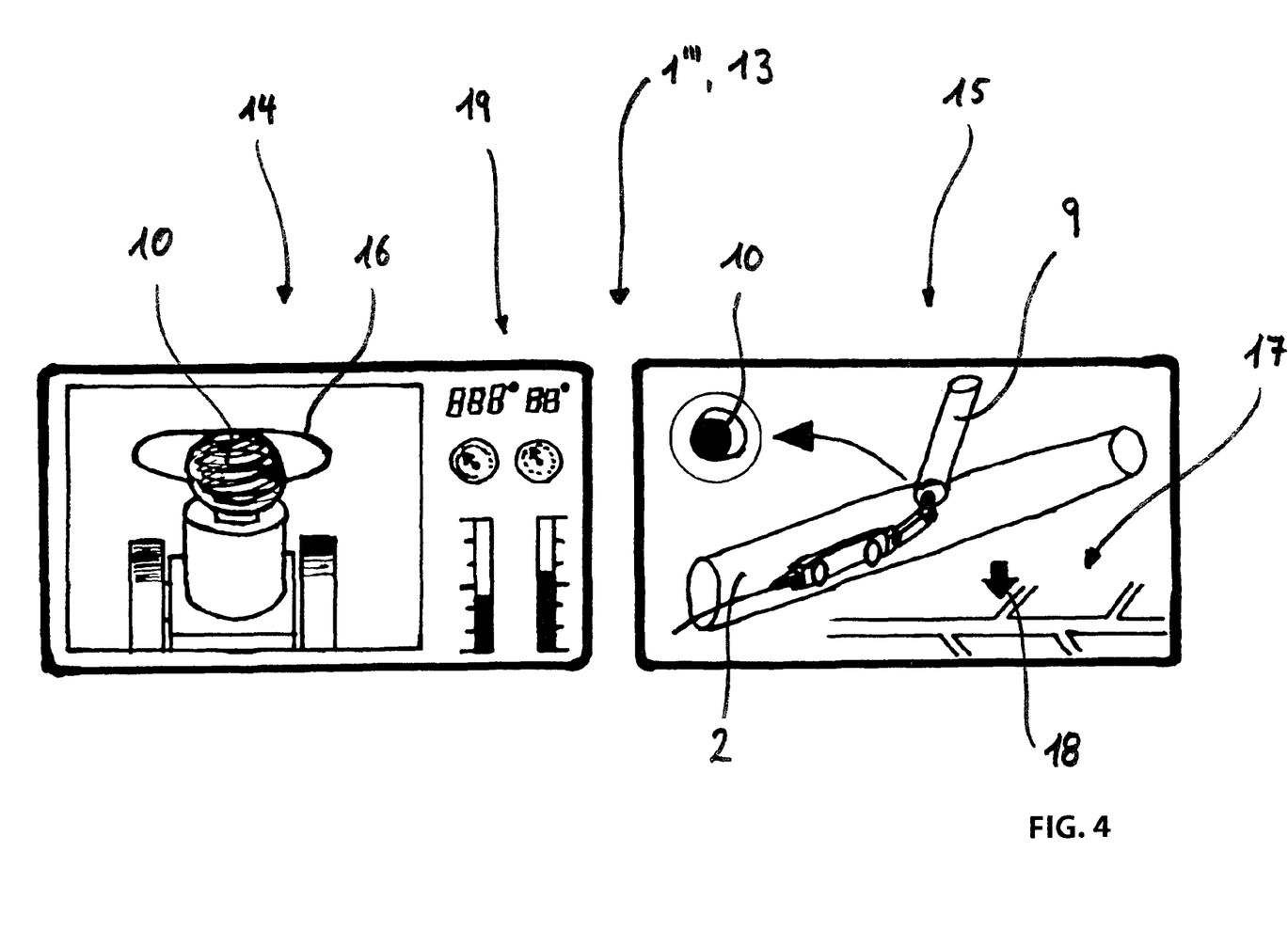
FIG. 4 illustrates an optional two portion visualization of a position of a vehicle within a pipe.

In another embodiment which is illustrated in FIG. 4 a display device 13 is illustrated which has two components. This means that the display device 13 illustrates a visualization 1''' which is formed from two individual components 14, 15. In the left component 14 a detail of a tool head 10 is visible, wherein a processing status is visible from a line 16 that is circumferential about the tool head 10, in how far the wall of the liner 7 is already milled open in the portion of the inlet 9. The left component 14 is a real image that has been captured by a camera which is attached at the arm 4 of the vehicle 3 like the tool 5. Besides this real image furthermore current operating parameters 19 are derivable from the left portion 14 of the visualization 1'''. As such for example information regarding prevailing temperature, speed of the tool head 10 of the tool 5, motor currents, position information for the vehicle 3 and/or for the tool head 10 and similar is conceivable. Information of this type facilitates a statement regarding an actual operating condition of the vehicle 5 for the operator. In particular it facilitates an early determination of problems during operations.

A representation according to FIG. 2 is illustrated in the right portion 15 of the visualization 1''' wherein furthermore an overview 17 is illustrated which indicates to the operator through a position arrow 18 at which location of the pipe 2 the vehicle is currently disposed. The right portion 15, contrary to the left portion 14, is a virtual illustration. In particular in an overview 17 it is particularly easily conceivable that partial sections of the pipe 2 that have already been processed and/or inlets that are already relieved are emphasized in color in order to indicate work process to an operator at a glance. Accidently omitting an inlet which unfortunately occurs now and then with known technology is almost impossible with the visualization according to the invention.

Figure 5:
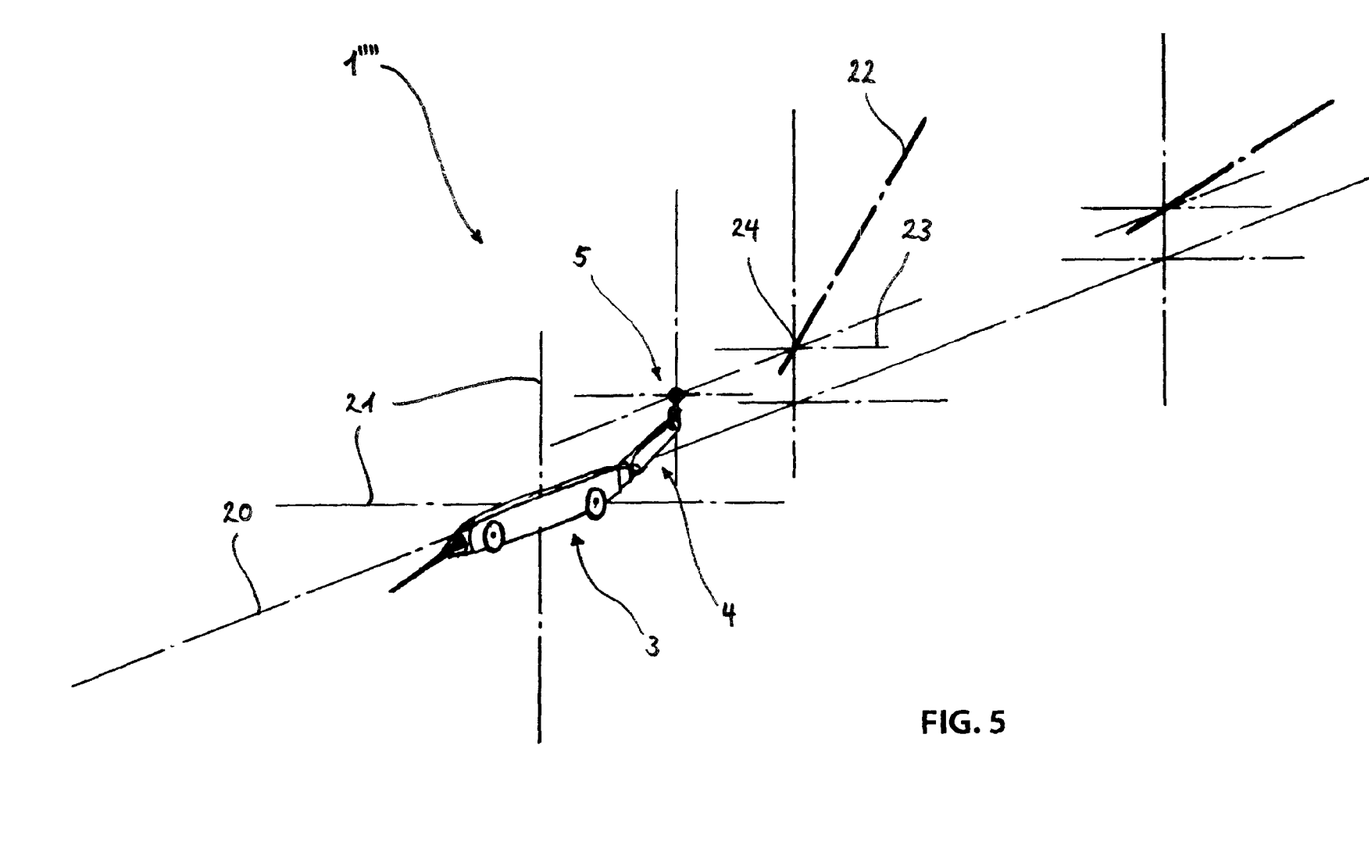
FIG. 5 illustrates another three dimensional visualization of a position of a vehicle within the pipe, wherein the pipe is represented by its body axes.

In another embodiment that is depicted in FIG. 5 another visualization 1'''' is provided which omits a representation of the pipe 2 as such. The pipe 2 like the inlet 9 is only illustrated through body axes, wherein in particular the pipe 2 is visualized through a longitudinal axis 22. The vehicle 3 including the arm 4 and the tool 5 is included as a body in this very abstract representation in order to obtain clarity for the visualization 1''''. The vehicle 3 and also the tool 5 are defined with respect to their positions respectively through 3 position axes 21 so that the operator directly obtains an impression regarding a position and an orientation of the vehicle 3 and of the tool 5 from the position axis 21.

The inlet 9, similar to the longitudinal axis of the pipe 2, is indicated by its longitudinal axis 22. At a location in which the inlet 9 intersects a wall of the tube 2 an intersection point 24 of the tube 2 and the inlet 9 is graphically indicated through an intersection axis 23. This way the operator can orient the tool 5 precisely relative to the inlet 9. It is in particular feasible in a very simple manner in this minimized representation to orient the tool 5 based on its position axes 21 with reference to the longitudinal axis 22 of the inlet 9 based and to successfully impact the liner 7 at this location and to mill it open.

The visualization 1'''' furthermore has the advantage that its representation requires rather small graphics power of a data processing device in order to represent the vehicle 3 and the pipe 2 virtually on a display device in a fluid manner.

REFERENCE NUMERALS AND DESIGNATIONS 1, 1', 1'', 1''', 1'''' visualization
2 pipe
3 vehicle
4 arm
5 tool
6 connecting conductor
7 liner
8 opening
9 inlet
10 tool head
11 longitudinal axis
12 line
13 display device
14 left portion
15 right portion
16 line
17 overview
18 position arrow
19 operating parameter
20 longitudinal axis
21 position axis
22 longitudinal axis
23 intersection axis
24 intersection point
H height

What is claimed is:

1. A method for visualizing a position of a vehicle in a pipe on a display device, comprising the steps:
   visualizing a position of a vehicle in a pipe and a graphical representation of the pipe on a display device through a virtual representation;
   graphically representing the pipe on the display device at least in sections through lines defining enveloping surfaces of the pipe; and
   representing the vehicle and movement of the vehicle in the pipe on the display device,
   wherein data regarding the pipe is determined in that the pipe is navigated by the vehicle,
   wherein data regarding the extension of the pipe and data regarding a position and a geometry of branches or inlets of other pipes into the pipe is captured through a camera arranged at the vehicle; and
   wherein the graphical representation of the pipe is generated from said data regarding the pipe, data regarding the extension of the pipe, and data regarding the position and the geometry of branches or inlets of other pipes.

2. The method according to claim 1, wherein data regarding the position and movement of the vehicle is determined by recording position changes of the vehicle from a known starting position of the vehicle in the representation of the pipe.

3. The method according to claim 1, wherein the data regarding the pipe is taken over from a map that is provided in digital form.

4. The method according to claim 1, wherein a graphical representation of sections of the pipe which have already been processed by the vehicle are represented in a different color than a graphical representation of sections of the pipe which are not yet processed.

5. The method according to claim 1, wherein the branches or inlets are graphically represented on the display device in color.

6. The method according to claim 1, wherein the lines for graphically representing the pipe on the display device are grid lines.

7. The method according to claim 1, wherein the pipe is photographically represented on the display device.

8. The method according to claim 1, wherein the vehicle includes at least one tool for processing the pipe, wherein the tool is a milling or boring tool, and wherein the vehicle includes a camera for monitoring a processing performed with the tool.

9. The method according to claim 1, wherein the vehicle in a representation on the display device includes a body that is provided with wheels or tracks and at least one arm movably connected with the body, wherein the tool or the camera is arranged at the body.

10. The method according to claim 1, wherein the graphical representation of the pipe on the display device is three dimensional.

11. The method according to claim 1, wherein the vehicle is represented on the display device in a different color than the pipe.

12. The method according to claim 1, wherein a graphical representation of sections of the pipe which have already been processed by the vehicle are represented differently from a graphical representation of sections of the pipe which are not yet processed.

13. The method according to claim 1, wherein for visualizing the position of the vehicle in the pipe on the display device an orientation of the vehicle or of an arm of the vehicle or of a tool of the vehicle is captured through at least one position sensor or angle sensor arranged at the vehicle.

14. The method according to claim 1, wherein a visualization on the display device is provided in two portions, wherein a first portion of the visualization includes the position of the vehicle in the pipe and the second portion of the visualization includes a detailed representation of the vehicle or of a tool of the vehicle.

15. The method according to claim 1, wherein the pipe is represented transparent or partially transparent or partially opened on the display device at least a location of the pipe where the vehicle is positioned.

16. The method according to claim 1, wherein the pipe is graphically represented on the display device and an orientation of the vehicle within the pipe is represented by body axes that are visualized within the graphical representation of the pipe.

17. The method according to claim 1, wherein the vehicle in a representation on the display device includes a body that is provided with wheels or tracks and at least one arm movably connected with the body, wherein the tool and the camera are arranged at the body.

18. The method according to claim 1, wherein for visualizing the position of the vehicle in the pipe on the display device an orientation of the vehicle and of an arm of the vehicle and of a tool of the vehicle are captured through at least one position sensor and angle sensor arranged at the vehicle.

19. The method according to claim 1, wherein a visualization on the display device is provided in plural portions, wherein a first portion of the visualization includes the position of the vehicle in the pipe and a second portion of the visualization includes a detailed representation of the vehicle and of a tool of the vehicle.

* * * * *